United States Patent
Dalton et al.

[11] Patent Number: 6,063,319
[45] Date of Patent: May 16, 2000

[54] METHOD AND APPARATUS FOR INJECTION MOLDING GOLF BALLS

[75] Inventors: Jeffrey L. Dalton, Dartmouth; Robert A. Wilson, Sagamore, both of Mass.

[73] Assignee: Acushnet Company, Fairhaven, Mass.

[21] Appl. No.: 09/153,036

[22] Filed: Sep. 15, 1998

[51] Int. Cl.⁷ .............. B29C 45/14; B29C 45/26
[52] U.S. Cl. .......... 264/275; 264/279.1; 264/328.12; 425/116; 425/120; 425/129.1; 425/573
[58] Field of Search ............... 425/120, 573, 425/116, 129.1; 264/275, 279.1, 328.12

[56] References Cited

U.S. PATENT DOCUMENTS

| | | | |
|---|---|---|---|
| 696,353 | 3/1902 | Richards | 473/368 |
| 698,516 | 4/1902 | Kempshall | 473/370 |
| 2,031,786 | 2/1936 | Oldham | 425/120 |
| 2,361,348 | 10/1944 | Dickson et al. | 425/116 |
| 2,376,085 | 5/1945 | Radford et al. | 264/275 |
| 3,068,522 | 12/1962 | Nickerson et al. | 264/278 |
| 4,959,000 | 9/1990 | Giza | 425/116 |
| 5,112,556 | 5/1992 | Miller | 264/279 |
| 5,122,046 | 6/1992 | Lavallee et al. | 425/116 |
| 5,150,906 | 9/1992 | Molitor et al. | 264/248 |
| 5,407,341 | 4/1995 | Endo et al. | 425/116 |
| 5,489,631 | 2/1996 | Dubois | 264/328.12 |
| 5,556,582 | 9/1996 | Kazmer | 264/328.12 |

FOREIGN PATENT DOCUMENTS

| | | |
|---|---|---|
| 10-175231 | 6/1998 | Japan. |
| 11-9722 | 1/1999 | Japan. |
| 11-42297 | 2/1999 | Japan. |

*Primary Examiner*—Robert Davis
*Attorney, Agent, or Firm*—Pennie & Edmonds LLP

[57] ABSTRACT

A method of injection molding a golf ball that includes a core and at least one cover layer disposed thereon is disclosed. The method comprises the steps of centering a core in a molding cavity, injecting a molten material into the cavity around the core at a plurality of locations such that the material simultaneously exerts a force on the core at each location. The forces have components that balance the core in three dimensions. Injection continues until the material covers the core and solidifies thereon. An injection mold for forming the golf ball is also disclosed. The mold includes a plurality of pins extending from a spherical outer surface of a molding cavity. The mold further includes a plurality of runners having radially extending portions that are non-aligned and terminate at gates for flowing a molten material in a fluid state into the cavity, and a means for simultaneously injecting the material into the cavity from the gates. The gates are at spaced locations on the surface of the cavity.

21 Claims, 6 Drawing Sheets

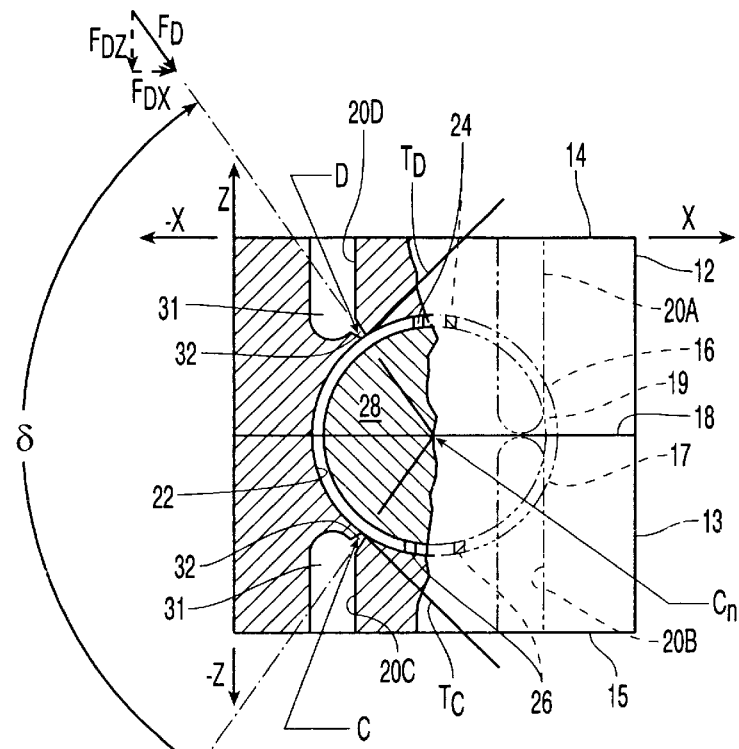
FIG. 2
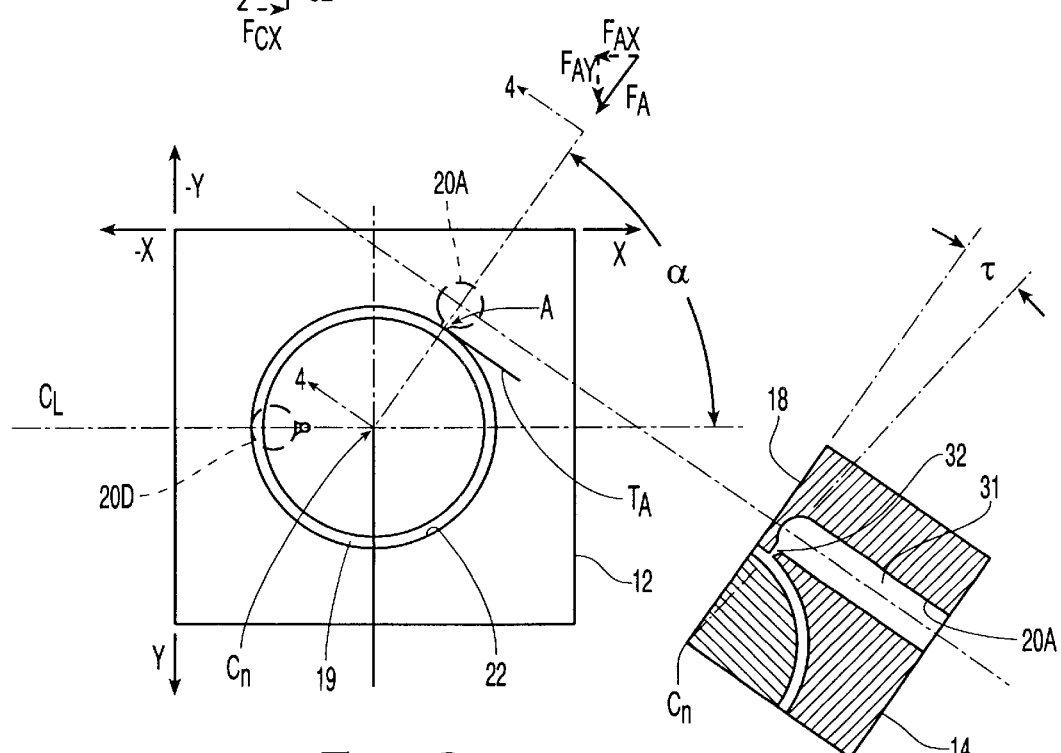
FIG. 3
FIG. 4

METHOD AND APPARATUS FOR INJECTION MOLDING GOLF BALLS

FIELD OF THE INVENTION

This invention relates generally to the manufacture of golf balls, and more particularly, to a method and apparatus for injection molding golf balls.

BACKGROUND OF THE INVENTION

Conventional golf balls generally include a core, which is encased by a cover. During use golf balls sustain repeated impacts, and those balls whose covers crack or chip are unusable. Therefore, it is critical to performance and ball life that the cover is durable.

Injection molding is a conventional method for forming the cover. According to well known techniques, injection molding utilizes a mold, which includes top and bottom mold plates, and an injection screw. Each plate defines a hemispherical molding cavity for receiving the core, a runner system for transporting a molten material, and one or more gates through which the material enters the cavity from the runner system. Generally, molds may also include pins as a centering means. Retractable pins are often used. The pins contact the core at the poles and hold the core in the cavity. The mold plates move between open and closed positions. In the open position, the mold plates are spaced apart. In the closed position, the mold plates are in contact at a mold parting plane, and the hemispherical molding cavities form a spherical molding cavity having a spherical, outer surface.

One molding cycle for forming a golf ball includes a number of steps. The core is placed within the bottom hemispherical molding cavity on the pins, and the mold plates are closed. The pins center the core in the spherical cavity during molding. Then, the injection screw forces the molten cover material through the runner system and gates into the molding cavity until the cavity is filled and the material surrounds the core. The pins begin to retract as the material comes into close proximity to the pins. The material flows and fills the apertures in the material caused by the pins. As the material cools, it solidifies in the shape of the molding cavity around the core. When the material is sufficiently cool, the formed golf ball is removed from the cavity, and the mold is made ready for another molding cycle.

When molding golf balls it is desirable that the core is centered within the cover so that the cover has a uniform thickness. It is also desirable that the core have a spherical shape. During molding, as the material enters the cavity, the material exerts forces on the core. These forces may tend to distort the core so that it is no longer spherical and/or move the core off-center. It is critical that the core is spherical and centered in the finished ball, since cores that are not spherical or off-center produce an unplayable ball.

One problem caused by the pins is that when the material contacts the pins during molding, the pins are colder than the molten material. The molten material contacts the pins and begins to solidify, and the remaining molten material may not bond properly with the solidified material. As a result, the pin sites are locations of stress concentration in the cover at the poles of the core. Moreover, the material that flows from one gate meets and joins the material that flows from another gate, and this interface forms a knit line when the material solidifies. Knit lines extend around the core and typically intersect at the poles of the core. The knit lines are weak locations in the cover. When these intersections are at the poles, where the pins also contacted the core, the stress concentrations in the cover are amplified and the likelihood of crack initiation increases undesirably.

Consequently, a need exists for an improved injection molding method and apparatus for manufacturing a golf ball. The method and apparatus should minimize deformation of the core, provide centering of the core in the cover during molding, and decrease stress concentrations in the cover.

SUMMARY OF THE INVENTION

According to the present invention a method of injection molding a golf ball that includes a core and at least one cover layer disposed thereon is disclosed. The method comprises the steps of centering a core in a molding cavity, injecting a molten material into the cavity around the core at a plurality of locations such that the material simultaneously exerts a force on the core at each location. The forces have components that balance the core in three dimensions. Injection continues until the material covers the core and solidifies thereon. Advantageously, this method maintains the spherical shape of the core and minimizes forming balls with the core off-center.

According to the present invention, an injection mold for forming a golf ball includes a plurality of pins extending from a spherical outer surface of a molding cavity. The mold further includes a plurality of non-aligned gates for flowing a molten material in a fluid state into the cavity radially, and a means for simultaneously injecting the material into the cavity from the gates. The gates are at spaced locations on the surface of the cavity.

In one embodiment, the gates are the vertices of a regular polyhedron. In another embodiment, the polyhedron is a tetrahedron.

BRIEF DESCRIPTION OF THE DRAWINGS

FIG. 2 is a cross-sectional view of the injection mold of FIG. 1 of the present invention.

FIG. 3 is a bottom view of a top plate of the injection mold of the present invention.

FIG. 4 is a cross-sectional view along line 4—4 of FIG. 3 of the injection mold of the present invention.

DETAILED DESCRIPTION OF THE PREFERRED EMBODIMENTS

Figure 1:
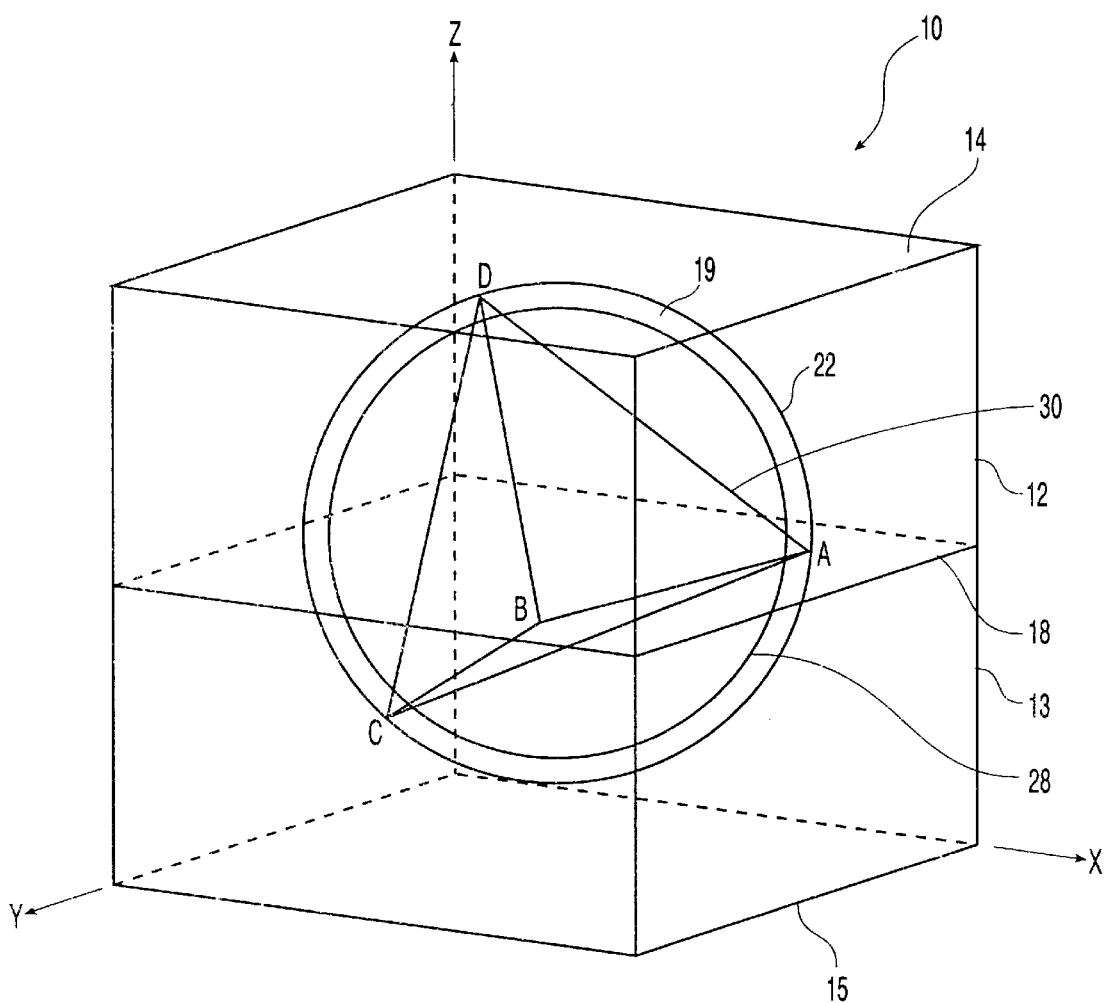
FIG. 1 is a schematic, perspective view of an injection mold of the present invention.

Referring to FIGS. 1–3, and 5, an injection mold 10 according to the present invention includes a first or top mold plate 12, and a second or bottom mold plate 13. The mold 10 defines x, y, and z axes according to the Cartesian Coordinate System. Each axis has a positive and a negative direction.

Referring to FIGS. 2 and 3, each plate 12 and 13 includes a hemispherical molding cavity 16 and 17, respectively. The top plate 12 has a top surface 14. The bottom plate 13 has a bottom surface 15. The top and bottom mold plates, 12 and 13, move between open and closed positions. In the open position (not shown), the mold plates 12 and 13 are spaced apart.

Referring to FIGS. 1–3, in the closed position, the mold plates are in contact at a mold parting plane 18 and the hemispherical cavities 16 and 17, form an internal, spherical molding cavity 19. Hot runners 20A–D retain hot nozzle tips for transporting a molten material from hot runner manifolds to a plurality of gates A, B, C, and D. The gates are openings through which the material enters the cavity 19 from the runners 20A–D. The spherical molding cavity 19 has an outer spherical surface 22 and a center $C_n$. The mold further includes a centerline $C_L$ that extends through the mold center $C_n$ parallel to the x-axis.

Referring to FIG. 2, a first set of retractable pins 24 extend from the top mold plate 12 in a first direction into the cavity 19. A second set of retractable pins 26 extend from the bottom mold plate 13 in a second direction opposite the first direction into the cavity 19. The retractable pins 24, 26 center a golf ball core 28 within the cavity 19 so that the core 28 is spaced from the cavity surface 22. The retractable pins 24 and 26 are movable between an extended position (as shown) and a retracted position. In the retracted position, the pins 24 and 26 are flush with the cavity surface 22. Conventional retractable pin configurations, which ensure simultaneous retraction of the pins are used. The core 28 is solid with a single layer of material or a multilayer core. The core 28 can also include an envelope filled with fluid as known by those of ordinary skill in the art.

Referring to FIG. 1, the gates A, B, C, and D are positioned on the surface 22 of the cavity 19, so that the gates are vertices of a regular polyhedron 30. The polyhedron 30 is a tetrahedron.

Referring to FIG. 2, an injection screw forces the molten material from a reservoir through the manifolds and tips and into the cavity 19. The runners 20A–D, manifolds, nozzle tips, reservoir, and injection screw are conventional components of the mold that are well known in the art.

Referring to FIGS. 1, 3, 4, and 7, the runner 20A for the first gate A has a vertical portion 31 and a radial portion 32. The vertical portion 31 of the runner 20A extends from the top surface 14 of the top mold plate 12 toward the parting line 18 and ends in the radial portion 32. The radial portion 32 of runner 20A extends radially toward the center $C_n$ and terminates at the gate A. The radial portion 32 of the runner 20A lies an angle τ above the mold parting plane 18 in the top mold plate 12. The angle τ is between about 2° to about 5°, and more preferably is about 3°. The tangent to the spherical surface 22 at gate A is designated with a line labeled $T_A$. The radial portion 32 of the runner 20A is normal to the tangent $T_A$ to the spherical surface 22. The angle between the radial portion 32 of runner 20A and the centerline $C_L$ is designated α. The angle α is about 55°.

Referring to FIGS. 1, 5, 6, and 7, the runner 20B for the second gate B has a vertical portion 31 and a radial portion 32. The vertical portion 31 of the runner 20B extends from the bottom surface 15 of the bottom mold plate 13 toward the parting line 18 and ends in the radial portion 32. The radial portion 32 of runner 20B extends radially toward the center $C_n$ and terminates at the gate B. The radial portion 32 of the runner 20B lies an angle τ below the mold parting plane 18 in the bottom mold plate 13. The angle τ is between about 2° to about 5°, and more preferably is about 3°. The tangent to the spherical surface 22 at gate B is designated with a line labeled $T_B$. The radial portion 32 of the runner 20B is normal to the tangent $T_B$ to the spherical surface 22. The angle between the radial portion 32 of runner 20B and the centerline $C_L$ is designated β. The angle β is about 55°. The angle between the radial portions 32 of the runners 20A and 20B is the sum of the angles α and β or 110°.

Figure 7:
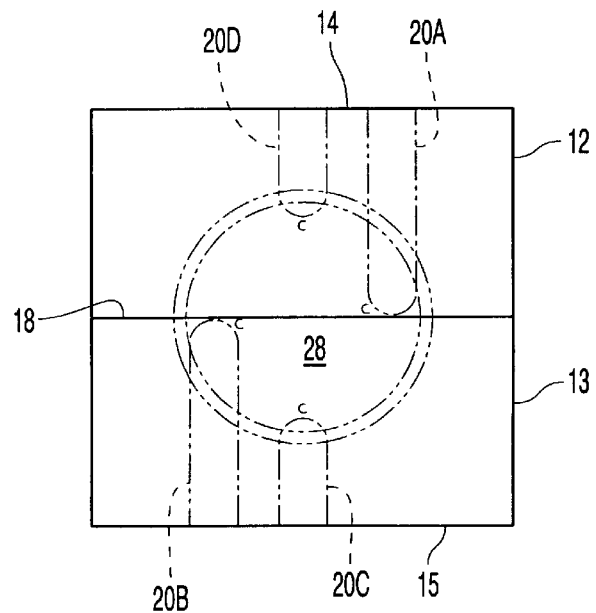
FIG. 7 is a side view of the injection mold of the present invention.

Referring to FIGS. 1, 2, and 7, the third gate C is located in the bottom mold plate 13. The fourth gate D, is located in the top mold plate 12. The gates C and D are in the same plane. Tangents to the spherical surface 22 at each gate C and D are designated with lines labeled $T_C$ and $T_D$, respectively. The runner 20C for the third gate C has a vertical portion 31 and a radial portion 32. The vertical portion 31 of the runner 20C extends from the bottom surface 15 of the bottom mold plate 13 toward the parting line 18 and ends in the radial portion 32. The radial portion 32 of runner 20C extends radially toward the center $C_n$ and terminates at the gate C. The radial portion 32 of the runner 20C is normal to the tangent $T_C$ to the spherical surface 22.

Referring to FIGS. 1, 2, and 7, the runner 20D for the fourth gate D has a vertical portion 31 and a radial portion 32. The vertical portion 31 of the runner 20D extends from the top surface 14 of the top mold plate 12 toward the parting line 18 and ends in the radial portion 32. The radial portion 32 of runner 20D extends radially toward the center $C_n$ and terminates at the gate D. The radial portion 32 of the runner 20D is normal to the tangent $T_D$ to the spherical surface 22. An angle δ is defined between the radial portions 32 of the runners 20C and 20D. The angle δ is about 110° or 109°34'. It is critical that the locations of the gates allows the mold to function as discussed below.

Figures 5, 6:
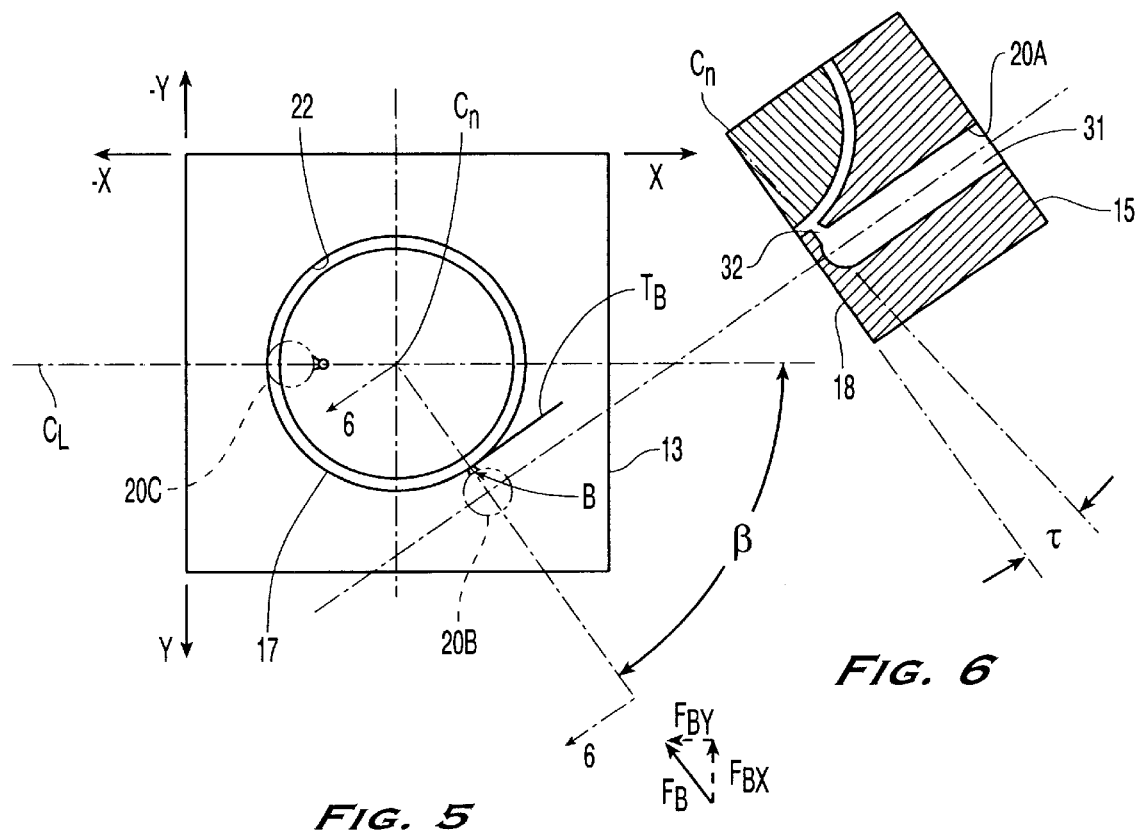
FIG. 5 is a top view of a bottom plate of the injection mold of the present invention.
FIG. 6 is a cross-sectional view along line 6—6 of FIG. 5 of the injection mold of the present invention.

Operation of the mold will now be discussed with reference to FIGS. 1, 2 and 7. The core 28 is placed within the molding cavity 19 and centered on the pins 24 and 26 within the cavity 19. Then the molten material (not shown) is injected through nozzle tips in the runners 20A–D into the cavity 19 at the gates A, B, C, and D. The material flows along radial, non-aligned directions toward the center $C_n$ simultaneously through the gates. The material exerts forces on the core 28 at each gate location. Referring to FIGS. 2, 3, and 5, each force is represented by the arrows designated $F_A$, $F_B$, $F_C$, and $F_D$, respectively.

Each force has components directed along the x, y, and z axii. The force $F_A$ of the fluid at gate A has components in the negative x-direction $F_{AX}$, the positive y-direction $F_{AY}$, and none in the z-direction. The force $F_B$ of the fluid at gate B has components in the negative x-direction $F_{BX}$, the negative y-direction $F_{BY}$, and none in the z-direction. The force $F_C$ of the fluid at gate C has components in the positive x-direction $F_{CX}$, none in the y-direction, and in the positive z-direction $F_{CZ}$. The force $F_D$ of the fluid at gate D has components in the positive x-direction $F_{DX}$, none in the y-direction, and in the negative z-direction $F_{DZ}$.

It is preferred that at least one pair of forces that oppose one another are non-aligned with one another. "Opposed" as used in the specification and claims means that the two opposed forces have at least one force component in opposite directions to one another. For example, force $F_A$ has a force component in the negative x-direction, and force $F_C$ has a force component in the positive x-direction, thus forces $F_A$ and $F_C$ are opposed. "Non-aligned" as used in the specification and claims means that the two non-aligned forces do not lie along the same diameter line drawn between the forces. For example, the pair of forces $F_A$ and $F_C$ are non-aligned.

Referring to FIGS. 2, 3, and 5, the arrangement of the gates A, B, C, and D prevents the forces exerted by the material on the core 28 from distorting or moving the core 28, when the material is flowed into the molding cavity 19. This is due to the fact that the force components along each axis in the positive direction equal the force components along each axis in the negative direction so that the components balance. Thus, the sum of the forces at each gate location produces a net force on the core equal substantially to zero, as discussed below.

Referring to FIGS. 2, 3 and 5, there are no x-axis forces on the core 28. The force components $F_{AX}$ and $F_{BX}$ in the negative x-direction, oppose and cancel out the force components $F_{CX}$ and $F_{DX}$ in the positive x-direction.

Referring to FIGS. 3 and 5, there are no y-axis forces on the core 28. The force component $F_{AY}$ in positive y-direction opposes and cancels the force component $F_{BY}$ in the negative y-direction.

Turning to FIG. 2, there are no z-axis forces on the core 28. The force component $F_{CZ}$ in the positive z-directions opposes and cancels the force component $F_{DZ}$ in the negative z-direction.

This force balance in three dimensions results from the gates allowing radial flow of the material, as well as due to the simultaneous injection of the molten material from all the gates. Thus, the core 28 remains spherical and centered within the material. This force balance as the material enters the cavity 19 also allows the core 28 to remain centered when the pins are retracted sooner than the retractable pins in a mold having pins at the poles of the core and gates located at the equator of the core. As a result, the pins 24 and 26 are retracted shortly after the material enters the cavity and contacts the core, which decreases the stress concentrations in the cover due to the pins. This occurs because the material does not contact the pins during molding and solidify unevenly.

Referring to FIG. 1, the injection of the material is continued until enough material has been injected to cover the core 28. The material then solidifies to form one layer covering the core 28. The ball is then ejected from the mold.

Figure 8:
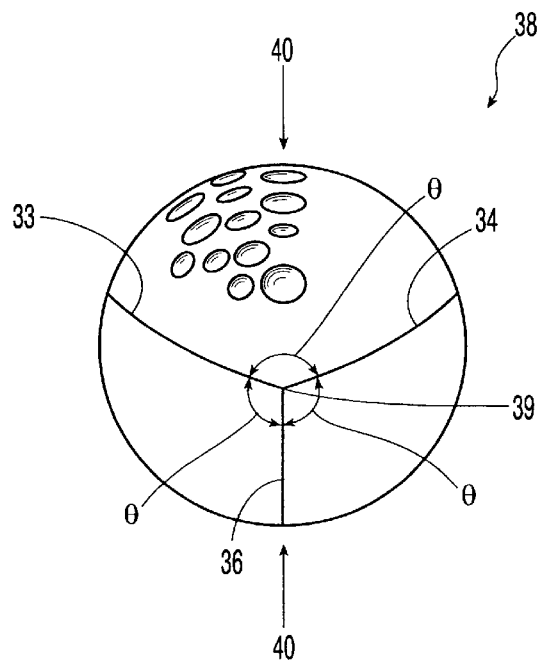
FIG. 8 is a side view of a golf ball formed using the injection mold of FIG. 1 of the present invention.

Referring to FIG. 8, during molding knit lines 33, 34, and 36 are formed on the ball 38 in the layer covering the core. The knit lines 33, 34, and 36 intersect one another, and have an angle θ therebetween. An intersection 39 of the knit lines 32, 34, and 36 is spaced from the ball poles 40, where the pins 24 and 26 (as shown in FIG. 2) contacted the core 28. This location of the intersection 39 decreases the magnification of the stress concentrations in the cover layer at the ball poles 40. It is preferred that the angle θ between the knit lines is about 120°.

Figure 9:
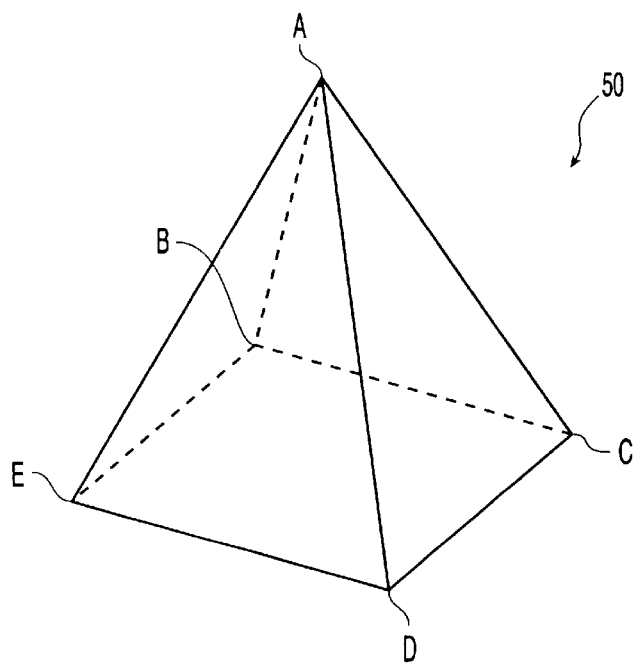
FIGS. 9–11 are schematic views of alternative arrangements of gates for use in the injection mold of the present invention.

Referring to FIG. 9, the mold includes a modified polyhedron 50, which determines the gate arrangement. The gate arrangement polyhedron 50 includes five gates A–E. The polyhedron 50 is a pentahedron or a pyramid.

Figure 10:
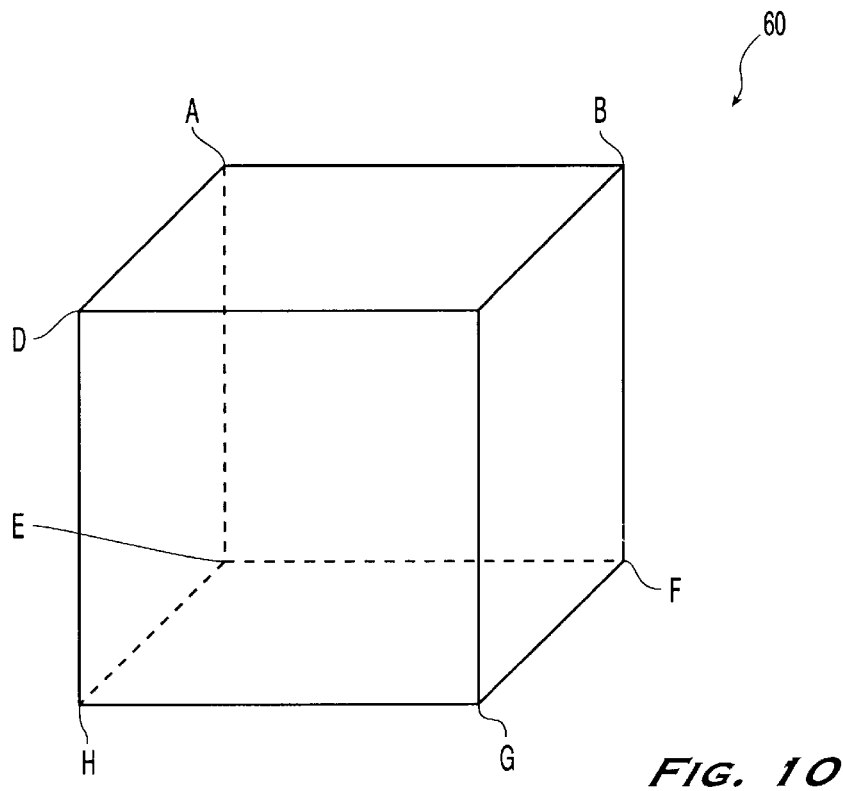

Referring to FIG. 10, a gate arrangement polyhedron 60 includes eight gates A–H. The polyhedron 60 is a hexahedron or a cube. It is preferred that gates A, D, F, and G lie in the mold parting plane.

Figure 11:
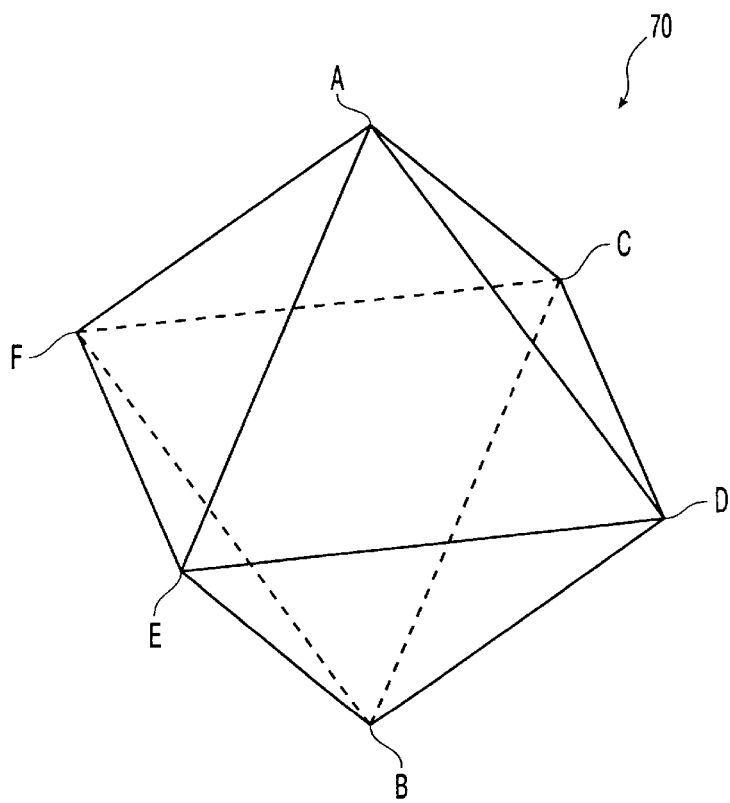

Referring to FIG. 11, a gate arrangement polyhedron 70 includes six gates A–F. The polyhedron 70 is an octahedron. Gate A is located in the top mold plate spaced from the mold parting plane. Gate B is located in the bottom mold plate spaced from the mold parting plane. Gates C–F lie in the mold parting plane. Thus, 67% of the gates lie in the mold parting plane.

Figure 12:
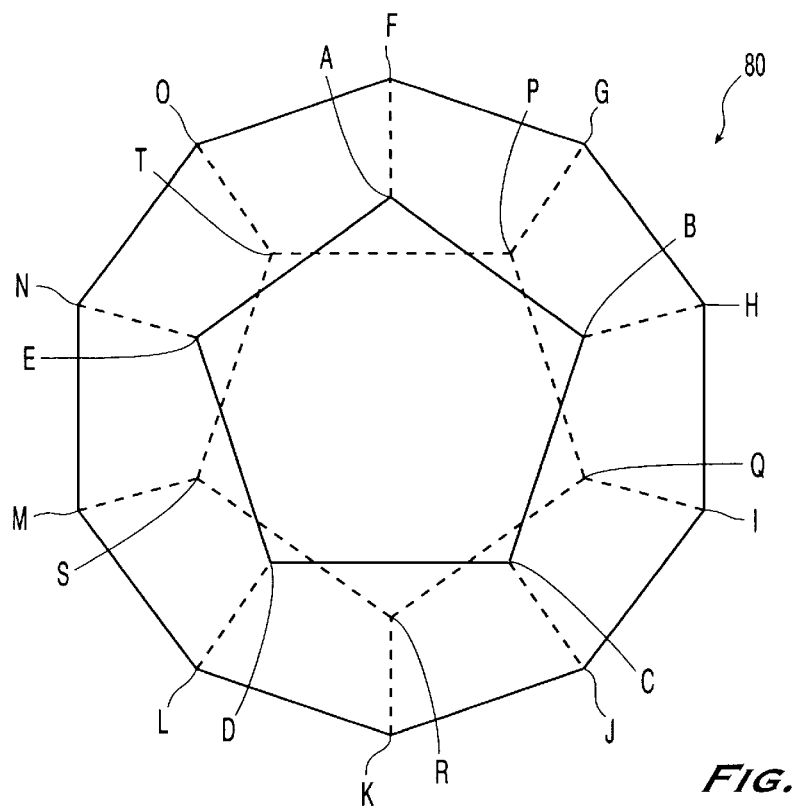
FIGS. 12 and 13 are top views of alternative arrangements of gates for use in the injection mold of the present invention.

Referring to FIG. 12, a gate arrangement polyhedron 80 includes twenty gates A–T. The polyhedron 80 is a dodecahedron. Gates A–E are located in the top mold plate spaced from the mold parting plane. Gates P–T and G, I, K, M and O are located in the bottom mold plate spaced from the mold parting plane. Gates F, H, J, L, and N lie in the mold parting plane. Thus, 25% of the gates are located at the mold parting plane.

Figure 13:
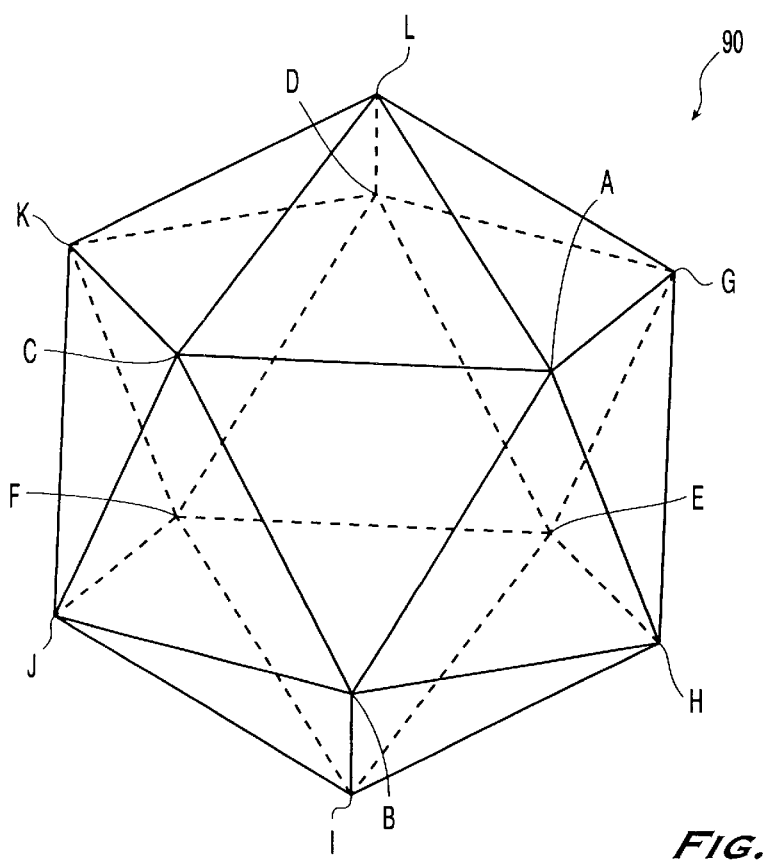

Referring to FIG. 13, a gate arrangement polyhedron 90 includes twelve gates A–L. The polyhedron 100 is an icosahedron. Gates A–C are located in the top mold plate spaced from the mold parting plane. Gates D–F are located in the bottom mold plate spaced from the mold parting plane. Gates H, J, and L lie in are located at the mold parting plane, and gates G, I, K, and M are spaced from the mold parting plane. Thus, 25% of the gates lie in the mold parting plane. The arrangements above can also be modified so that none of the gates lie in the mold parting plane; however this is more difficult to machine.

While it is apparent that the illustrative embodiments of the invention herein disclosed fulfill the objectives stated above, it will be appreciated that numerous modifications and other embodiments may be devised by those skilled in the art. For example, although a polyhedron is the basis for locating the gates any gate arrangement that allows the method and apparatus to function as described above may be used. In addition the present invention is used to inject additional layers of the molten material on the core. The process applies to forming the cover layer and/or the intermediate layer between the core and cover. After one layer is injected and solidified according to the method of the present invention additional layers can be injected. Thus, the invention is equally applicable to any or all molding processes for thermoplastic layers in multilayer component golf balls. Specifically in solid, three piece balls. Therefore, it will be understood that the appended claims are intended to cover all such modifications and embodiments which come within the spirit and scope of the present invention.

What is claimed is:

1. A method of injection molding a golf ball having a core and at least one layer of material covering said core, comprising the steps of:

a) placing said core centrally within a molding cavity having a center and defining an outer spherical surface and x, y, and z axes, as positioned in the cartesian coordinate system;

b) injecting molten material through said spherical surface and into said cavity at a plurality of spaced gates located on said surface;

c) injecting said molten material simultaneously through said gates and along radial, non-aligned directions toward said center of the cavity and under forces having force components directed along said x, y, and z axes, in both the positive and negative directions relative to said x, y, and z axes;

d) balancing the force components so that the force components along each of the x, y, and z axes in the positive direction equal the force components along the x, y, and z axes in the negative direction, respectively;

e) continuing said injection of said molten material until enough of said molten material has been injected to cover said core; and f) solidifying said molten material to define said one layer of material covering said core.

2. The method of claim 1, wherein the step of injecting said molten material simultaneously further includes the step of arranging at least two of the gates lie in one plane and an angle between the gates in the one plane is about 110°.

3. The method of claim 1, wherein the step of injecting said molten material simultaneously further includes the step of selecting a predetermined number of gates.

4. The method of claim 1, wherein the step of injecting said molten material simultaneously further includes the step of arranging the gates as vertices of a polyhedron.

5. The method of claim 1, wherein the step of injecting said molten material simultaneously further includes the step of arranging the gates as vertices of a tetrahedron.

6. The method of claim 1, wherein the step of placing said core further includes the step of centering said core with a plurality of retractable pins, and the injecting molten material step further includes the step of retracting the pins after said material contacts the core.

7. The method of claim 6, further including the step of forming a plurality of knit lines about said core in said one layer, said knit lines intersecting at least at one location spaced from the location on said core contacted by the pins.

8. The method of claim 7, wherein the step of forming a plurality of knit lines further includes the step of intersecting said knit lines at an angle to one another of about 120°.

9. The method of claim 1, further including the steps of:
 a) placing said core within said one layer of material within said molding cavity;
 b) injecting additional molten material through said spherical surface and into said cavity at a plurality of spaced gates located on said surface;
 c) injecting said molten material simultaneously through said gates and along radial, non-aligned directions toward said center of the cavity and under forces having force components directed along said x, y, and z axes, in both the positive and negative directions relative to said x, y, and z axes;
 d) balancing the force components so that the force components along each of the x, y, and z axes in the positive direction equal the force components along the x, y, and z axes in the negative direction, respectively;
 e) continuing said injection of said molten material until enough of said molten material has been injected to cover said core within said one layer of material; and
 f) solidifying said molten material to define said second layer of material covering said core.

10. The method of claim 1, wherein said core includes a fluid.

11. An injection mold for forming a golf ball having a core and at least one layer of material disposed thereon, the mold comprising:
 a) a x-axis, a y-axis, and a z-axis as positioned in the cartesian coordinate system;
 b) an internal molding cavity for receiving said core, said cavity defining an outer spherical surface;
 c) a plurality of pins for spacing and centering said core within said cavity;
 d) a plurality of runners terminating at a plurality of gates for flowing a molten material into said cavity, each of said runners having a radially extending portion adjacent said surface at spaced locations, and at least one runner extends substantially parallel said x-axis, said y-axis, and said z-axis, and said gates are non-aligned with one another; and
 e) a means for simultaneously injecting said material through said gates into said cavity.

12. The injection mold of claim 11, further including:
 a) a first mold plate having a first hemispherical cavity;
 b) a second mold plate having a second hemispherical cavity, such that upon mating the first mold plate with the second mold plate the first hemispherical cavity and the second hemispherical cavity form said cavity and a mold parting plane delineates the mating surfaces of the mold plates, wherein at least one of said gates are spaced from the mold parting plane.

13. The injection mold of claim 11, wherein the gates are arranged as vertices of a polyhedron.

14. The injection mold of claim 11, wherein the gates are arranged as vertices of a tetrahedron.

15. The injection mold of claim 14, wherein a first runner is disposed in the first mold plate, the first runner having a radial portion that is disposed at an angle above the mold parting plane; a second runner is disposed in the second mold plate, the second runner having a radial portion that is disposed at the angle below the mold parting plane; a third runner is disposed in the first mold plate and spaced from the mold parting plane; a fourth runner is disposed in the second mold plate and spaced from the mold parting plane; and the third gate and the fourth gate lie in one plane.

16. The injection mold of claim 15, wherein the first runner radial portion is angularly offset from the second runner radial portion by about 110°.

17. The injection mold of claim 15, wherein the angle is about 3°.

18. The injection mold of claim 16, wherein the third runner has a radial portion and the fourth runner has a radial portion and the third runner radial portion is angularly offset from the fourth runner radial portion by about 110°.

19. The injection mold of claim 11, wherein at least 25% of the gates lie in the mold parting plane.

20. The injection mold of claim 11, wherein at least 50% of the gates lie in the mold parting plane.

21. The injection mold of claim 12, wherein said pins are retractable.

* * * * *